July 6, 1926.
J. C. DAVENPORT
TRANSFORMER
Filed Sept. 27, 1920
1,591,934
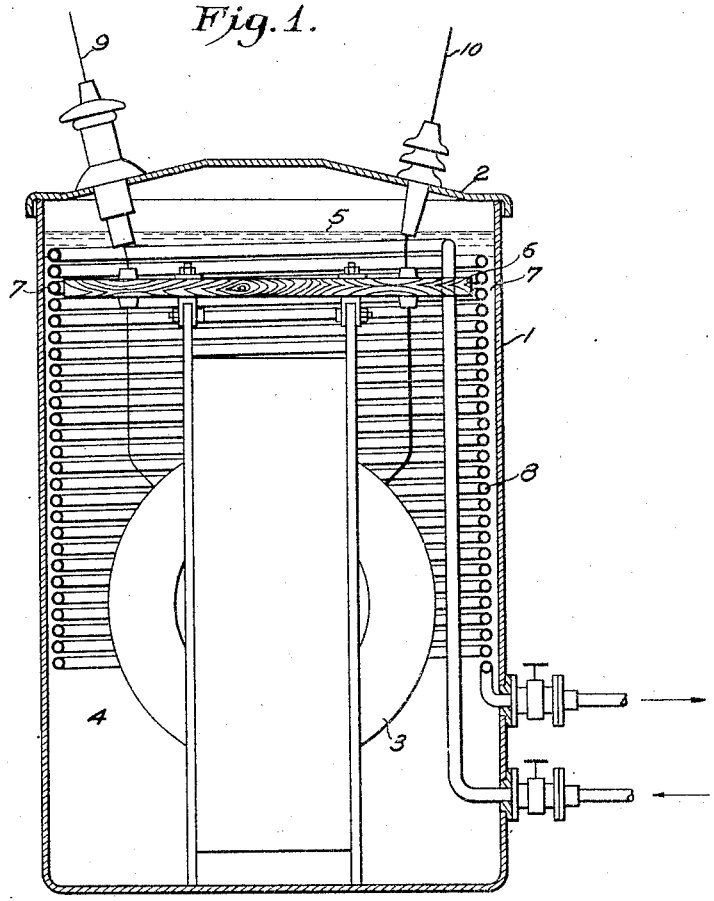
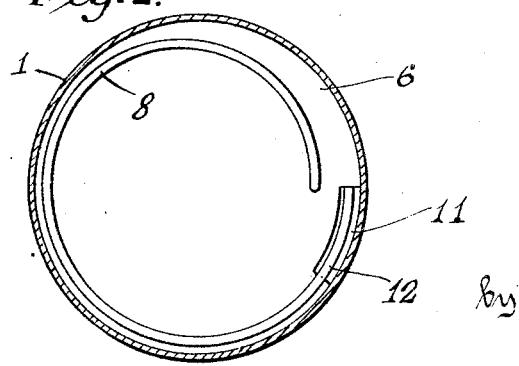

Patented July 6, 1926.

1,591,934

UNITED STATES PATENT OFFICE.

JOHN C. DAVENPORT, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

TRANSFORMER.

Application filed September 27, 1920. Serial No. 413,080.

This invention relates to the cooling of electrical apparatus and particularly to such apparatus as for example transformers which are cooled by a body of oil. It is found that where oil is in contact with the atmosphere and the oil is above a critical temperature, sludging or oxidation takes place which is undesirable as it affects the insulating properties of the oil. One of the methods hitherto proposed to keep the temperature of the oil below the sluding temperature comprises the use of a barrier extending horizontally clear across a transformer tank, with means for cooling the oil below and above the barrier; the barrier being perforated, in the middle and elsewhere, to permit the lower body of oil to expand. It is an object of the present invention to provide an improved construction whereby hot oil expanded out of the main body of oil cooling the transformer will not reach the surface oil. It is a further object to provide means whereby all oil which is expanded out of the main body of cooling oil will be first forced to pass through cooling means before it reaches the surface oil. Other objects will appear hereinafter as the description of the invention proceeds.

The novel features of the invention will appear from this specification and the accompanying drawing forming a part thereof, and disclosing one embodiment of said invention and all these novel features are intended to be pointed out in the claims.

In the drawings, Fig. 1 is an elevation of a transformer embodying the invention some of the parts being in section;

Fig. 2 is a plan view of a modification.

In the drawing the transformer is provided with a tank 1, having a cover 2. In accordance with the present invention it is not necessary that the cover be fitted airtight to the tank. The tank is here shown as containing a transformer 3 immersed in a main body of oil 4, the surface oil 5 being in contact with the air in the transformer tank. A barrier 6, mounted in any suitable fashion is disposed below the surface of the oil in such manner as to divide the oil into a lower major and an upper minor body, The barrier 6 is here shown as made of wood although it may be made of any suitable heat insulating material. The barrier 6 is here shown as of less diameter than the tank 1 thereby providing a space 7 between the outer edge of the barrier and the inner tank wall. It is to be understood however that it is not necessary for this space to extend all the way around the barrier.

A single cooling coil 8 in which any cooling fluid, as water, may be circulated is disposed so that a portion of it is below the barrier, a portion above the same, and a portion in the space 7, so as to cool the major body of oil, the minor body of oil and the oil in said space. It is of course clear that separate circulating systems might be used for this purpose.

The transformer is shown as provided with high and low tension leads 9, 10 respectively. These leads are here shown as passing through the barrier 6 but with a substantially tight fit so that as far as any exchange of oil as between the major and minor bodies is concerned the barrier is substantially imperforate, and the latter term is used in this sense in the claims.

The action of the cooling system under operating conditions is as follows:

As the transformer heats up, the main body of oil becomes hot and is cooled to the desired extent by the coils 8. It is possible however that this main body of oil may be at the sludging temperature but even so, as this main body of oil expands the portion of oil expanded therefrom is forced to pass between the barrier and the tank wall whereby it is cooled by the coils located in that space. When the main body of oil has ceased to expand, the cooling coils located above the barrier serve to keep the minor body of oil at a comparatively low temperature, in accordance with the fundamental laws of circulation. Even though the barrier 6 is not an absolute insulator and heat is transmitted from the main body of oil through the barrier to the minor body, the cooling coils above the barrier are sufficient to take care of this heat exchange. It will therefore be seen that by reason of the construction and location of the parts the surface oil will be kept below a sludging temperature. It will be further seen that by keeping the barrier imperforate so that none of the very hottest oil, (which is always centrally located immediately above the transformer core), can be expanded into the minor body so as to reach the surface oil, as would be the case in the proposed construction hereinbefore referred to, In the modification shown in Fig. 2 a barrier 6, of generally circular form to conform with the shape of the tank 1, is shown disposed in said tank. A segmental portion of this barrier at the periphery thereof is cut away so as to leave a gap 11, through which gap the portion 12 of the pipe 8 may pass between the upper and lower sides of the barrier 6. In this figure the pipe 8 is shown as having but a single turn above the barrier. It is of course obvious that the gap 11 may be made of any suitable or desirable size. It will be noted that the gap 11 results by reason of the relative form of the barrier and tank.

It should be understood that it is not desired that the invention claimed be limited to the exact details of construction shown and described for obvious modifications will occur to a person skilled in the art.

It is claimed and desired to secure by Letters Patent:

1. In combination, a tank adapted to contain electrical apparatus immersed in oil, a substantially horizontal imperforate heat-insulating barrier submerged below the surface of the oil, said barrier and tank being relatively of such form as to leave a space between said barrier and a wall of said tank, and a cooling pipe disposed in said space.

2. In combination, a tank adapted to contain electrical apparatus immersed in oil, a substantially horizontal imperforate heat-insulating barrier dividing said oil into a lower major and an upper minor body, said barrier and tank being relatively of such form as to leave a space between said barrier and a wall of said tank, and means for cooling said major body and the oil in said space.

3. In combination, a tank adapted to contain electrical apparatus immersed in oil, a substantially horizontal imperforate heat-insulating barrier dividing said oil into a lower major and an upper minor body, said barrier and tank being relatively of such form as to leave a space between said barrier and a wall of said tank, and means for cooling said major body, said minor body, and the oil in said space.

4. In combination a tank adapted to contain electrical apparatus immersed in oil, means for dividing the oil in said tank into a lower major and an upper minor body, means for permitting oil to pass between said major and minor bodies, and means for cooling oil as it passes from said major to said minor body.

5. In combination a tank adapted to contain electrical apparatus immersed in oil, means for dividing said oil into a lower major and an upper minor body, means for permitting oil to pass between said major and minor bodies, means for cooling said major body, and means for further cooling the oil as it passes from said major to said minor body.

6. In combination a tank adapted to contain electrical apparatus immersed in oil, means for dividing said oil into a lower major and an upper minor body, means for permitting oil to pass between said major and minor bodies, means for cooling said major body, means for cooling said minor body and means for further cooling the oil as it passes from said major to said minor body.

In testimony whereof, the signature of the inventor is affixed hereto.

JOHN C. DAVENPORT.